(12) United States Patent
Burke et al.

(10) Patent No.: US 12,385,657 B2
(45) Date of Patent: *Aug. 12, 2025

(54) IN LINE AIR FILTRATION AND PURIFICATION APPARATUS

(71) Applicants: Paul C. Burke, Lake Forest, IL (US); D. Scott Kalous, Kenosha, WI (US); Charles Harris, Lincoln City, OR (US)

(72) Inventors: Paul C. Burke, Lake Forest, IL (US); D. Scott Kalous, Kenosha, WI (US); Charles Harris, Lincoln City, OR (US)

(73) Assignee: Konnectronix, Inc., Gurnee, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,413

(22) Filed: Jun. 12, 2023

(65) Prior Publication Data

US 2023/0324058 A1 Oct. 12, 2023

Related U.S. Application Data

(63) Continuation of application No. 16/813,067, filed on Mar. 9, 2020, now Pat. No. 11,674,703, which is a continuation of application No. 15/633,370, filed on Jun. 26, 2017, now Pat. No. 10,584,885, which is a continuation-in-part of application No. 13/836,401, filed on Mar. 15, 2013, now Pat. No. 9,689,580, and a continuation-in-part of application No. 13/405,991, filed on Feb. 27, 2012, now abandoned, and a continuation-in-part of application No. 11/098,202, filed on Apr. 4, 2005, now Pat. No. 8,123,836.

(51) Int. Cl.
| | | |
|---|---|---|
| F24F 8/10 | (2021.01) |
| B01D 46/00 | (2022.01) |
| B01D 46/12 | (2022.01) |
| B01D 46/42 | (2006.01) |
| B01D 46/62 | (2022.01) |
| F24F 1/0073 | (2019.01) |
| F24F 1/0076 | (2019.01) |

(52) U.S. Cl.
CPC ............ *F24F 8/10* (2021.01); *B01D 46/0039* (2013.01); *B01D 46/0041* (2013.01); *B01D 46/12* (2013.01); *B01D 46/42* (2013.01); *B01D 46/62* (2022.01); *F24F 1/0073* (2019.02); *F24F 1/0076* (2019.02); *B01D 2267/40* (2013.01); *B01D 2273/30* (2013.01)

(58) Field of Classification Search
None
See application file for complete search history.

(56) References Cited

U.S. PATENT DOCUMENTS 6,878,195 B2 * 4/2005 Gibson .................. F24C 15/20
 55/DIG. 36
11,349,419 B2 * 5/2022 Lauw ...................... H02P 21/22

* cited by examiner

*Primary Examiner* — Brit E. Anbacht
(74) *Attorney, Agent, or Firm* — Vitale, Vickrey, Niro, Solon & Gasey LLP

(57) ABSTRACT

A method and apparatus for an inline air purification system including a housing, a high-velocity air flow guide, a filter assembly, and a fan.

2 Claims, 5 Drawing Sheets

IN LINE AIR FILTRATION AND PURIFICATION APPARATUS

PRIORITY OF INVENTION

This application is a continuation of and claims priority to application Ser. No. 16/813,067, now U.S. Pat. No. 11,674,703 which is a continuation of application Ser. No. 15/633,370, which issued as U.S. Pat. No. 10,584,885 on Mar. 10, 2020 which is a Continuation of and claims priority to application Ser. No. 13/836,401, which issued as U.S. Pat. No. 9,689,580 on Jun. 27, 2017, and is further a Continuation in Part and claims priority of application Ser. No. 11/098,202, filed Apr. 4, 2005, which issued as U.S. Pat. No. 8,123,836 on Feb. 28, 2012.

FIELD OF THE INVENTION

The present disclosure relates generally to inline air filtration and purification, and more particularly, to a method and apparatus for processing air moving in a duct of an HVAC system.

Although certain example methods and apparatuses have been described herein, the scope of coverage of this patent is not limited thereto. On the contrary, this patent covers all embodiments and modifications falling within the scope of the appended claims either literally or under the doctrine of equivalents.

BACKGROUND OF THE INVENTION AND PRIOR ART

Concern over air quality has triggered some developments in the area of indoor air quality improvement and/or control. Such developments have typically resulted in the production of various types of air processing systems including air filtration systems. Air filtration systems are sometimes differentiated according to air filtering capabilities and may include air filtration devices designed to be integrated within a heating, ventilation, and air conditioning (HVAC) system, or local or unitary air filtration devices. Air may include air filtration devices designed to be integrated within a heating, ventilation, and air conditioning (HVAC) system, or local or unitary air filtration devices. Air filtration devices configured to be integrated with HVAC systems (i.e., integrated air filtration devices) are typically capable of filtering large amounts of ambient air such as, for example, an amount of ambient air that fills a warehouse, an office building, an apartment building, a house, an entertainment hall, etc. In contrast, local or unitary air filtration devices are typically configured to filter an amount of ambient air associated with a local area such as, for example, an office, a bedroom, a bathroom, etc. The equipment described here is for use in an HVAC system.

Air filters in existing air filtration devices maybe inefficiently used because of the angle at which ambient air enters and is drawn through the air filters. In particular, in some cases only a relatively small area or space of an air filter is used effectively to trap particles while the rest of the air filter remains unused. As a result, the maintenance cost of air filtration devices may increase because air filters may be prematurely replaced and/or air flow throughput may decrease because the air filtration devices may be frequently turned off for cleaning of the air filters.

SUMMARY OF THE INVENTION

In general, a method and apparatus for processing air flowing in an HVAC system are disclosed herein. An example apparatus for processing air includes a duct, a housing, a filter assembly, a fan, and a high-velocity air flow guide. The filter assembly includes one or more filtering elements configured to generate filtered air based on ambient air in a chamber of the housing. The fan is configured to draw part of the air flowing through the duct into a chamber and through the filter assembly to generate processed air. The high-velocity air flow guide includes an upstanding portion and a support portion having a first portion and a second portion. In particular, the first portion is configured to form a passage within the housing, and the second portion is configured to divert the ambient air from the passage to the chamber. The second portion is configured to accelerate the air flow from a first speed to a second speed into the chamber prior to the fan drawing the ambient air from the chamber through the filter assembly. Thus, a cross section view of the air flow from the chamber is substantially the same as the surface area of the receiving portion of the filter assembly. By distributing a volume of ambient air over a greater portion of the front of the filter assembly, the air filters of the filter assembly are used in a relatively efficient manner, and the maintenance cost of the filter assembly may be reduced.

Only a part of the air flow in the duct is processed. The remainder of the air flow bypasses the housing, guide, chamber, filter, and fan. This bypass air flows directly to the primary fan or blower in the HVAC system. The processed air rejoins and mixes with the by passed air. Because the air mixes, substantially all of the air in the HVAC system is ultimately processed through the filtration system as the air in the system recirculates. Because only a part of the airflow is processed, the primary fan is not starved of air. The two flows can be balanced to optimize filtration while insuring that problems that might result from starving the primary fan or blower are avoided. For example, a combustion or cooling unit in the HVAC will be supplied with adequate flow to avoid over heating or a reduction in cooling.

Figure 1:
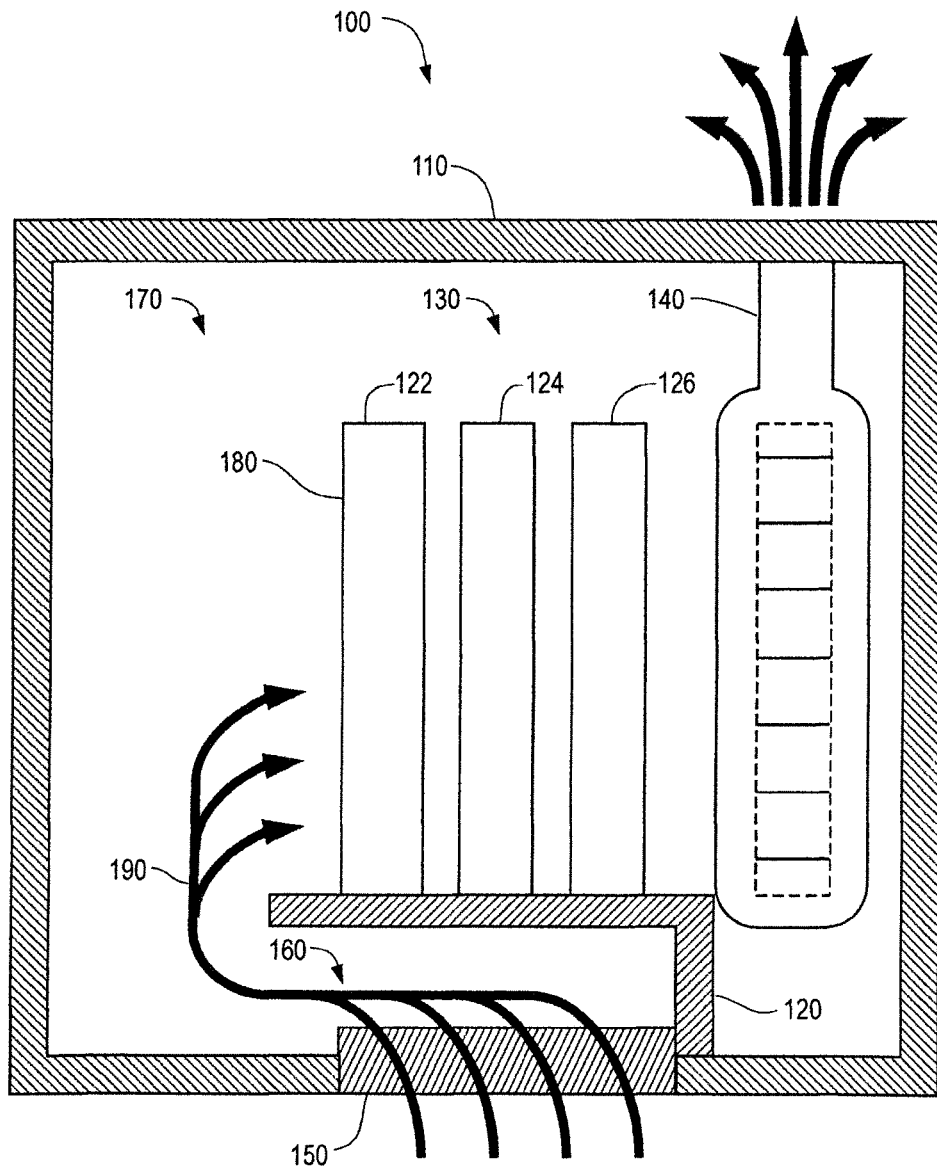
FIG. 1 depicts an example air processing system configured in an existing system.

Referring to FIG. 1, an air processing system 100 configured in a known manner typically includes a housing 110, an air flow guide 120, a filter assembly 130, and a fan 140. In general, the air processing system 100 receives ambient air from an intake vent 150 of the housing 110 into a passage 160. The air flow guide 120 is configured to divert or guide the ambient air through the passage 160 and into a chamber 170 of the housing 110. The filter assembly 130 includes one or more air filters 122, 124, and 126, to filter the ambient air from the chamber 170. The fan 140 draws the ambient air from the chamber 170 into the filter assembly 130 via a receiving surface 180 of the filter assembly 130. Typically, the fan 140 immediately draws the ambient air from the passage 160 into the filter assembly 130 in a direction generally indicated by arrows 190. The air flow indicated by the arrows 190 does not permit the chamber 170 fill with ambient air prior to the fan 140 drawing the ambient air through the filter assembly 130.

Figure 2:
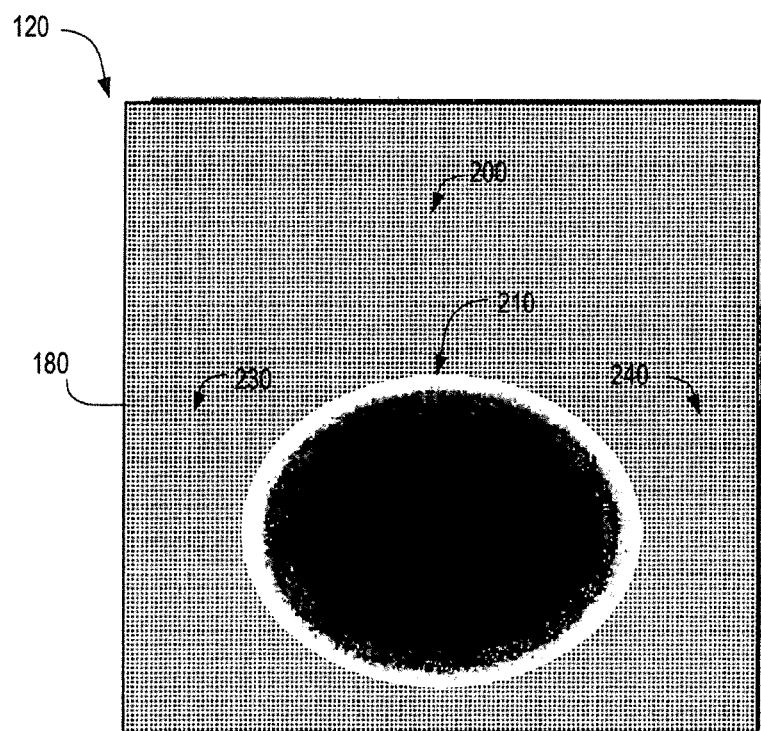
FIG. 2 depicts a front view of a receiving surface of a filter assembly of the example air processing system of FIG. 1.

Turning to FIG. 2 as an example, the ambient air is substantially filtered through a lower-center portion 210 of the receiving surface 180 of the filter assembly 130. The upper, left, and right portions, generally shown as 220, 230, and 240, respectively, of the receiving surface 180 are substantially unused. Thus, each of the one or more filters of the filter assembly 130 traps contaminants and, thus, becomes clogged in the lower-center portion 210.

Figure 3:
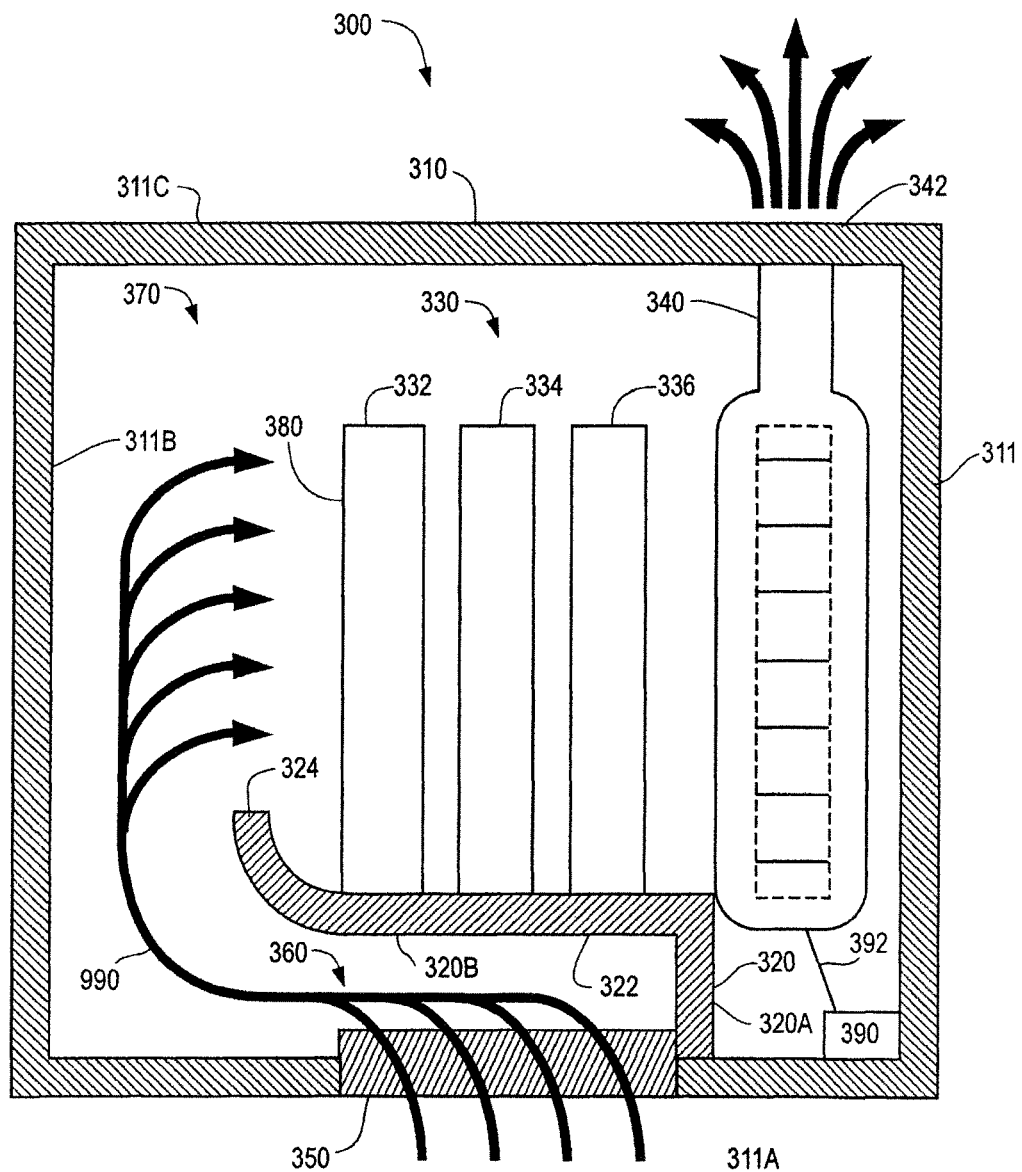
FIG. 3 depicts an example of a high-velocity air processing system configured in accordance with the teachings disclosed herein.

Turning now to FIG. 3, a high velocity air processing system 300 configured in accordance with the teachings of the present disclosure is illustrated. The high-velocity air processing system 300 includes a housing 310, a high-velocity air flow guide 320, a filter assembly 330, and a fan 340. In general, the high-velocity air processing system 300 receives ambient air from an intake vent 350 of the housing 310 via a passage 360. The intake vent 350 may be configured to operate in combination with the high-velocity air flow guide 320 as described in detail below by enabling ambient air to flow into a chamber 370 of the housing 310 in a direction generally indicated by arrows 990. The intake vent 350 may include a grate, a screen, and/or a large particle filter (none of which are shown. In one implementation, a layered configuration for the intake vent 350 may include the grate as the outermost layer followed by the screen, and the large particular filter as the innermost layer. The grate may be impact resistant to prevent damage to the screen, the large particle filter, and the portions of the high-velocity air processing system 300 located within the housing 310. The screen may be configured to prevent relatively large objects (e.g., paper, coins, food, etc.) from entering into the housing 310. The large particle filter may be configured to prevent relatively large particles (e.g., dust, hair, lint, liquid, etc.) from entering the housing 310.

Although the housing 310 is shown as having a relatively cubical structure, any other geometry or structure may be used to implement the housing 310 including, for example, a pyramidal structure, a cylindrical structure, a trapezoidal structure, etc. In the illustrated example, however, the housing 310 is cubical in shape and includes a bottom panel 311A, a plurality of upstanding side panels 311B, and a top panel 311C. The intake vent 350 is approximately centrally located in the bottom panel 311A, thereby enabling air to be drawn into the chamber 370 through the bottom of the housing 310. The housing 310 may include at least one vertical riser (not shown) upon which the housing 310 sits, such that the intake vent 350 is elevated above a support structure of the housing (e.g. a floor), to allow air to flow into the chamber 370 through the intake vent 350.

The high-velocity air flow guide 320 includes an upstanding portion 320A extending upward from the bottom panel 311A, and a support portion 320B extending over and generally parallel to the face of the vent 350. The support portion 320B is adapted to support the filter assembly 330. As shown, the filter assembly 330 is centrally located in the housing 310 and rests upon the support portion 320B of the high-velocity air flow guide 320. While the filter assembly 330 is shown as extending less than the distance between the support portion 320B and the top panel 311C, the filter assembly 330 and each individual filter within the assembly 330 may extend any amount between the support portion 320B and the top panel 311C.

Also located with the housing 310 is the fan 340. The fan 340 is located to a side of the filter assembly 330 opposite the chamber 370. The fan 340 includes an output vent 342 located in the top panel 311C. The output vent 342 allows the fan 340 to draw air from the chamber 370 through the filter assembly 330 and exhaust out the vent 342.

The housing 310 may also include an access panel and/or a control panel (neither of which are shown). The access panel may be configured to enable access to the filter assembly 330 and/or the fan 340 within the housing 310 for maintenance, inspection, and/or any other purpose. The control panel may be mechanically and/or electrically coupled to the housing 310 and configured to provide data input and output capabilities for controlling and/or monitoring any aspect of the high-velocity air processing system 300. For example, the control panel may be used to control operational states of the high-velocity air processing system 300. In addition, the control panel may be used to access status information associated with operations and/or status of the high-velocity air processing system 300.

The support portion 320B of the high-velocity air flow guide 320 (e.g., an air flow guide) includes a first portion 322 and a second portion 324. The high-velocity air flow guide 320 may be implemented using plastic, metal, and/or other suitable material. The first portion 322 is configured to receive ambient air from the intake vent 350 (i.e., an intake structure) and form the passage 360 in conjunction with the intake vent 350. The second portion 324 is configured to accelerate the ambient air from the passage 360 into a chamber 370 of the housing 310 to generate a high-velocity air flow in a direction generally indicated by the arrows 990. In particular, the second portion 324 diverts or guides the ambient air into the chamber 370 so that the ambient air is generally evenly distributed relative to a receiving surface 380 of the filter assembly 330 as the fan 340 draws the ambient air from the chamber 370 through the filter assembly 330. The second portion 324 may be, for example, a radial portion or curved lip to accelerate the ambient air into the chamber 370 in the manner shown and described. For example, the air traveling through the passage 360 may accelerate over the radial second portion 324 so that the speed of the air after the radial second portion 324 is greater than the speed of the air in the passage 360.

Figure 4:
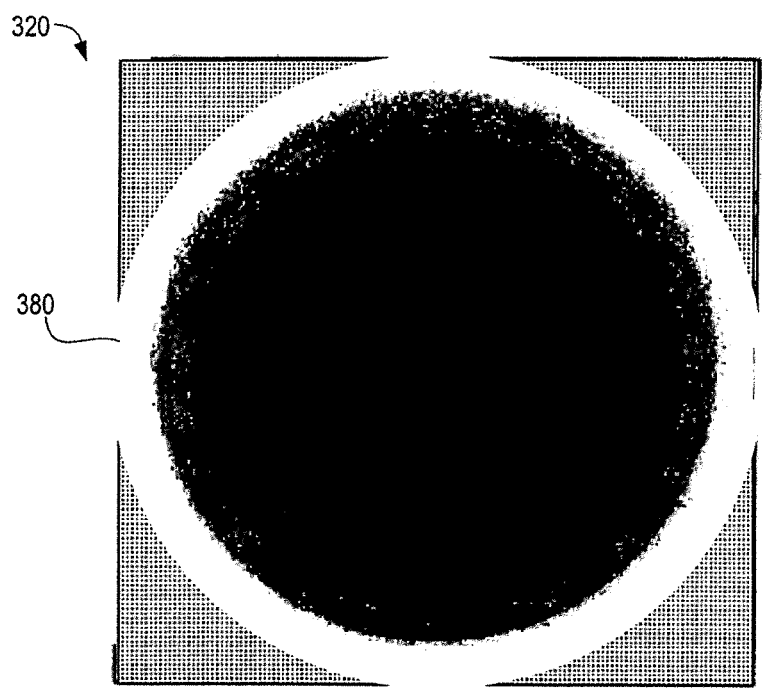
FIG. 4 depicts a front view of a receiving surface of a filter assembly of the example high-velocity air processing system of FIG. 3.

Referring now to FIG. 4, in this example, the second portion 324 diverts or guides the ambient from the passage 360 into the chamber 370 so that more area of the receiving surface 380 of the filter assembly 330 is used. By distributing the ambient air more evenly throughout the receiving surface 380, the second portion 324 increases air flow throughput. In contrast to the receiving surface 180 shown in FIGS. 1 and 2 for example, the second portion 324 diverts ambient air from the passage 360 and accelerates air flow of the ambient air into the chamber 370 prior to the fan 340 drawing the ambient air through the filter assembly 330. Thus, the time between filter replacements or cleanings may be extended. For example, the filter assembly 330 may be rated for operation based on an amount of time or a volume of air that is processed. In particular, the filter assembly 330 may be rated to operate for a predetermined amount of time (at a constant flow) before needing to be replaced or cleaned. Alternatively, the filter assembly 330 may be rated to operate for a predetermined total volume of air before needing to be replaced or cleaned. By increasing the life of the filter assembly 330, maintenance costs may be reduced.

Although the high-velocity air flow guide 320 is depicted in FIG. 3 as a single, integrated structure, the upstanding portion 320A and the support portion 320B including the first portion 322 and the second portion 324 may be separate structures operatively coupled to each other. For example, the second portion 324 may be a separate structure, adjustably coupled to the first portion 322 so that the second portion 324 may be adjusted to increase/decrease the second air flow speed. For instance, the second portion 324 may be flexibly or pivotally attached to the first portion 322.

The filter assembly 330 may include a plurality of air filter elements, generally shown as a first filter 332, a second filter 334, and a third filter 336 to process the ambient air from the chamber 370. For example, the first filter 332 may be a pre-filter, the second filter 334 may be a High Efficiency Particulate Accumulator (HEPA) filter, and the third filter 336 may be a charcoal filter. In particular, the first filter 332 may be an electrostatic filter or a pleated filter having antimicrobial properties. The first filter 332 may be used to pre-filter the ambient air that is drawn into the housing 310 via the intake vent 350 to remove relatively large pollutants or particles (e.g., dust, lint, etc.) from the ambient air. The HEPA filter used to implement the second filter 334 may be used to capture many bacteria, viruses, allergens (e.g., pollens, spores, smoke, etc.), and other relatively small organisms or particles that may be found in ambient air. The charcoal filter used to implement the third filter 336 may be used to remove volatile organic compounds (VOC)(e.g., certain chemicals, gases, etc.) and odors from the ambient air.

Although the filter assembly 330 is depicted in FIG. 3 to include three filters, the filter assembly 330 may include more or fewer filters. Further, the illustrated filter assembly 330 is positioned so that the receiving surface 380 of the filter assembly 330 is substantially perpendicular relative to the intake vent 350. That is, the receiving surface 380 is parallel to a plane that is substantially perpendicular to the intake vent 350, in this manner, the ambient air is drawn into the housing 310 by the fan 340 via the intake vent 350 in a direction generally indicated by arrows 990. Alternatively, the filter assembly 330 may be skewed at an angle relative to the intake vent 350. For example, the receiving surface 380 may be parallel to a plane that intersects the intake vent 350 at an angle other than perpendicular. Further, one filter of the filter assembly 320 may be disposed in a first position relative to the intake vent 350 and another filter of the filter assembly 330 may disposed in a second position relative to the intake vent 350.

For example, the first filter 332 may be skewed at an angle relative to the intake vent 350, whereas the second filter 334 may be substantially perpendicular relative to the intake vent 350.

The fan 340 may be a squirrel cage fan, or any other type of fan configured to draw ambient air from the intake vent 350 into the housing 310 through the filter assembly 330 and push or exhaust processed air out of the housing 310 through the vent 342. The fan 340 may be a variable speed fan communicatively coupled to and controlled by an information processing system 390 via a link 392. For example, the speed of the fan 340 may be controlled based on information received by the information processing system 390.

The information processing system 390 may be implemented using any processing system, including, by way of example, a computer, an application specific integrated circuit (ASIC), a processor system or other suitable device. In this example, the information processing system 390 is a processor system 2000 illustrated in FIG. 5 and configured to control and/or monitor operations of the high-velocity air processing system 300. The information processing system 390 may be communicatively coupled to the control panel (not shown) and configured to receive commands entered via the control panel by a person, in addition, the information processing system 390 may be configured to display information via the control panel, or other suitable display.

The method and apparatus disclosed herein may be integrated within devices such as, for example, a kiosk, an information booth, an automated teller machine, a public telephone, an advertisement apparatus, a computer terminal, etc. to process ambient air.

Figure 5:
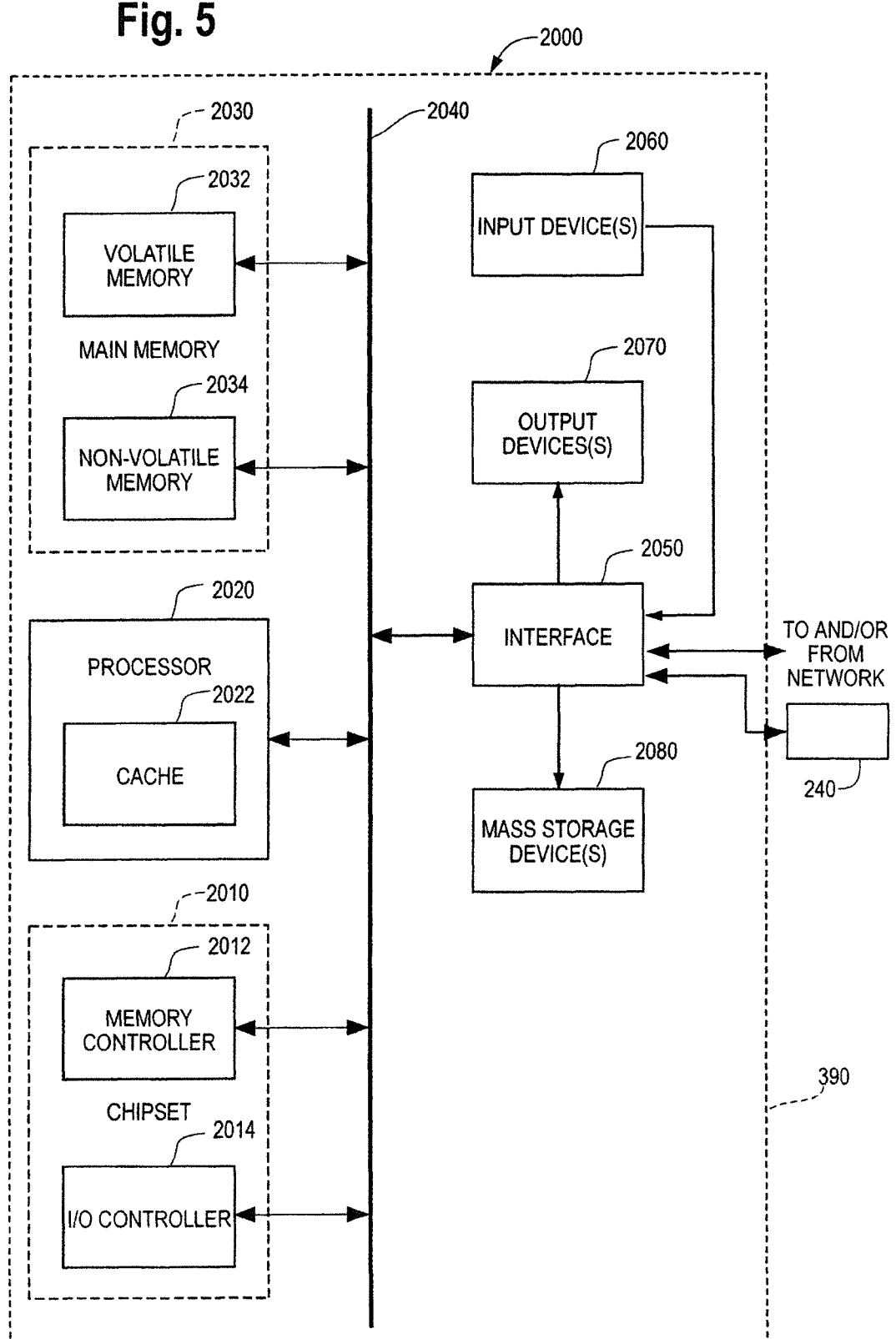
FIG. 5 is a block diagram of an exemplary processor system that may be used to implement the method and apparatus described herein.

FIG. 5 is a block diagram of an example processor system 2000 adapted to be implemented as the information processing system 390. The processor system 2000 may be, for example, a desktop computer, a personal computer, a dedicated computer, a laptop computer, a notebook computer, a personal digital assistant (PDA), a server, an Internet appliance or any other type of computing device.

In this example, the processor system 2000 illustrated in FIG. 5 includes a chipset 2010, which includes a memory controller 2012 and an input/output (I/O) controller 2014. As is well known, a chipset typically provides memory and I/O management functions, as well as a plurality of general purpose and/or special purpose registers, timers, etc. that are accessible or used by a processor 2020. The processor 2020 is implemented using one or more processors. The processor 2020 includes a cache 2022, which may be implemented using a first-level unified cache (L1), a second-level unified cache (L2), a third-level unified cache (L3), and/or any other suitable structures to store data.

As is conventional, the memory controller 2012 performs functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM). Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 also includes an interface circuit 2050 that is coupled to the bus 2040. The interface circuit 2050 may be implemented using any type of well known interface standard such as an Ethernet interface, a universal serial bus (USB), a third generation input/output interface (3010) interface, and/or any other suitable type of interface. Additionally, the interface 2050 may couple the processing system to the fan 240 via the link 392.

One or more input devices 2060 are connected to the interface circuit 2050. The input device(s) 2060 permit a user to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 are also connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050, thus, typically includes, among other things, a graphics driver card.

The processor system 2000 also includes one or more mass storage devices 2080 to store software and/or data. Examples of such mass storage device(s) 2080 include floppy disks and drives, hard disk drives, compact disks and drives, and digital versatile disks (DVD) and drives.

The interface circuit 2050 also includes a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network is typically controlled by the I/O controller 2014 in a conventional manner. In particular, the I/O controller 2014 performs functions that enable the processor 2020 to communicate with the input device(s) 2060, the output device(s) 2070, the mass storage device(s) 2080 and/or the network via the bus 2040 and the interface circuit 2050.

While the components shown in FIG. 5 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

In one example of operation, the processor system 2000 may control the speed of the fan 340 to process air through the air processing system 300. For instance, the processor system 2000 may start the fan 340, causing air to be drawn into the system 300. The system 300 receives the ambient air from the intake vent 350 of the housing 310 wherein the ambient air is diverted by the air flow guide 320 in the chamber 370 through the passage 360. The air flow guide 320 accelerates the air flow from a first air flow speed to a greater second air flow speed as the second portion 324 of the support portion 320B diverts the air into the chamber 370. The second portion 324 diverts or guides the ambient air from the passage 360 into the chamber 370 so that more area of the receiving surface 380 of the filter assembly 330 is used. For instance, a cross sectional view of the air flow from the chamber 370 onto the filter assembly 330 is substantially the same as the area of the receiving surface 380 of the filter assembly 330. From there, the ambient air travels through the filter assembly 330, into the fan 340, and exhausts out the vent 342 as processed and filtered air.

Figure 6:
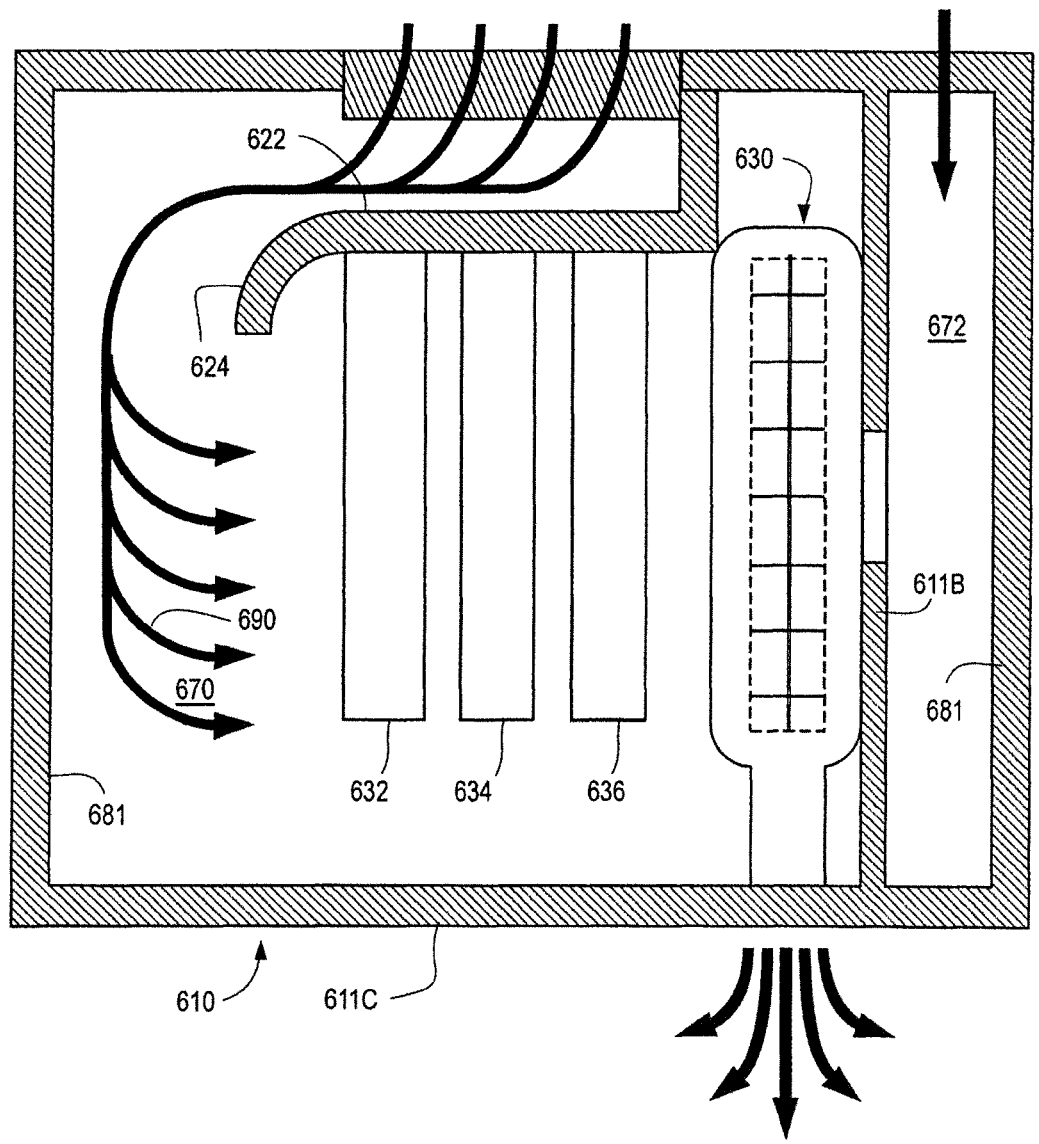
FIG. 6 depicts an example of a high-velocity air processing system incorporated into an HVAC duct in accordance with the teachings disclosed herein.

FIG. 6 shows a high-velocity air processing system 600 incorporated into a duct 680 of an HVAC system. The duct walls 681 enclose processing system 600. Air enters at the top of FIG. 6. A housing 610 has walls 611A, 611B, and 611C. The housing supports a fan 640 and filters 632, 634 and 636 to process air from chamber 670. As with FIG. 3, the filters may be of different types, and fewer or more filters may be used. The housing, as before, may be differently shaped depending, for example, on duct size or shape and the location of processing system 600 in duct 680.

Housing wall 611B separates the airflow being processed from the remaining air, which flows through bypass 672, continuing to a primary HVAC fan that is not shown. Duct wall 611B terminates at a point past the outlet of fan 640. Processed air is free at that point to mix with air passing through bypass 672.

A high-velocity air flow guide 620 may be formed with housing wall 611A. Guide 620 and wall 611A can also be separate structures. Guide 620 includes a first portion 622 and a second portion 624. First portion 622, cooperating with duct wall 611B, causes the incoming air flow to turn so that it can enter a chamber 670. Second portion 624 accelerates the air flow into chamber 670 so the airflow is distributed approximately as shown by arrows 690. As in the case of FIG. 3, the airflow is delivered to the face of first filter 632 at approximately a right angle. Filter efficiency is enhanced as described in the discussion of FIG. 3 and FIG. 4. Portions 622 and 624 can be separate structures. For example, second portion 624 could be hinged so that it is adjustable.

Filters 632, 634, and 636 are shown as approximately parallel to the path of incoming air. As with FIG. 3, the filters may be oriented at another angle with respect to the airflow, or the filters may be at angles which differ from each other.

Fan 640 is supported by any convenient means. It draws air from filters 632, 634 and 636, through a plenum 638 in housing 610. Fan 640 exhausts air between plenum 638 and housing wall 611B. Once wall 611B ends, processed air mixes with the balance of the air traveling through bypass 672. Mixing and recirculation of air in the HVAC system causes all the air in the system to be process by processing system 610.

The processor system of FIG. 5 may also be used with the system of FIG. 6.

What is claimed is:

1. An HVAC system for providing inline air purification for an air stream comprising:
    a ductwork section having a given air flow cross-sectional area for drawing an air stream in a first direction therethrough;
    a diverter for diverting a first portion of the air stream in at least a second direction that is substantially orthogonal to the first direction, the second portion of the air stream remaining flowing in the first direction;
    a filter assembly including three filtering elements and a fan for drawing the first portion of the air stream with the fan through the three filtering elements configured to receive the first portion of the airstream from a chamber of a housing located with the ductwork section, the three filtering elements being substantially orthogonal to the second direction, the three filtering elements including at least one high efficiency particulate accumulator filter; and
    a bypass duct for receiving the second portion of the air stream such that the second portion of the air stream is not drawn by the filter assembly fan through the filtering elements, whereby the bypass duct and the fan minimizes the pressure drop occurring as a result of drawing the first portion of the air stream through the three filter elements of the filter assembly.

2. An HVAC system for processing an air stream comprising:
    a ductwork section having a given air flow cross-sectional area for drawing an air stream in a first direction therethrough;
    a high-velocity air flow guide disposed within the ductwork section for diverting a first portion of the air stream in a second direction that is substantially orthogonal to the first direction, the second portion of the air stream remaining flowing in the first direction, the high-velocity air flow guide comprising a first section, and a second, curved section;

a filter assembly including three filtering elements and a fan for drawing the first portion of the air stream with the fan through the three filtering elements configured to receive the first portion of the airstream from a chamber of a housing located with the ductwork section, the three filtering elements being substantially orthogonal to the second direction, the three filtering elements including at least one charcoal filter; and a bypass duct for receiving the second portion of the air stream such that the second portion of the air stream is not drawn by the filter assembly fan through the three filtering elements, whereby the bypass duct and the fan minimizes the pressure drop occurring as a result of drawing the first portion of the air stream through the three filter elements of the filter assembly.

* * * * *